Oct. 16, 1962   W. G. CORSON ETAL   3,058,738
BUMPER UNIT FOR TRUCK LOADING DOCKS OR THE LIKE
Filed Jan. 19, 1959   3 Sheets-Sheet 1

INVENTOR.
William G. Corson
& William E. Corson
BY
William Cleland
Attorney

Oct. 16, 1962 W. G. CORSON ETAL 3,058,738
BUMPER UNIT FOR TRUCK LOADING DOCKS OR THE LIKE
Filed Jan. 19, 1959 3 Sheets-Sheet 2

INVENTOR.
William G. Corson
& William E. Corson
BY
William Cleland
Attorney

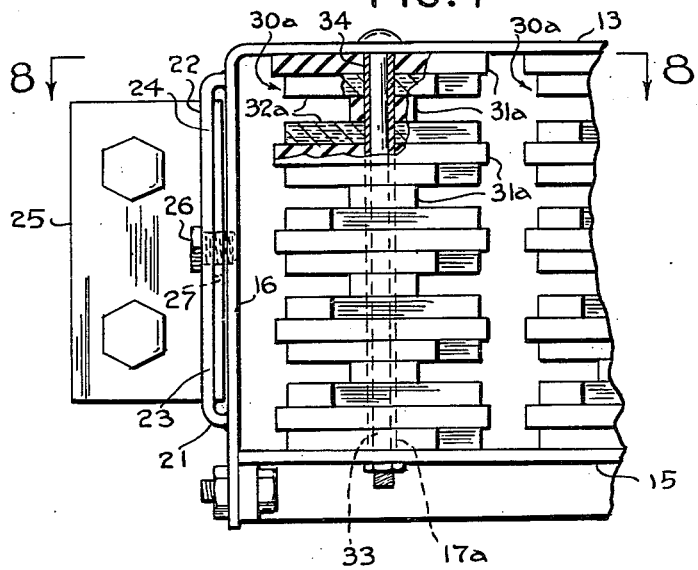
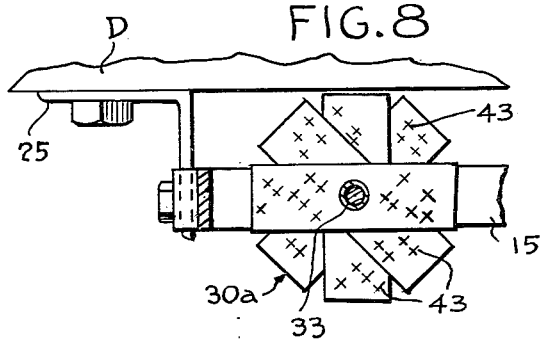

3,058,738
Patented Oct. 16, 1962

3,058,738
BUMPER UNIT FOR TRUCK LOADING DOCKS OR THE LIKE
William G. Corson, 270 Hedgewood Drive, Akron 19, Ohio, and William E. Corson, 101 Beauparc Drive, Akron 13, Ohio
Filed Jan. 19, 1959, Ser. No. 787,562
10 Claims. (Cl. 267—1)

This invention relates to a shock-absorbing bumper unit for truck loading docks or the like.

Heretofore, bumper units of the character described have been provided by mounting superposed layers of elastic material on a truck loading dock to have aligned edges engageable by the usual heavy metal bumpers of trucks. Such bumper units have not been entirely satisfactory, however, because repeated vertical movement of the truck bumpers in both directions, occasioned by increasing and decreasing loads on the truck, caused a severe vertical brushing or scuffing action combined with inward depression of the bumper layers, which in turn caused premature wear and destruction of the bumper unit.

One object of the invention is to provide a laminated bumper unit of the character described, which will absorb shock of inward impact of a truck bumper, and yet will have requisite flexing propensity to absorb scuffing or rubbing action and thereby obviate premature wearing out of the bumper unit.

Another object of the invention is to provide a shock absorbing bumper unit including one or more resilient blocks and improved mounting means therefor, wherein a minimum of strain is applied to the mounting means upon impact of a truck bumper against the resilient block or blocks, for example.

Another object of the invention is to provide a bumper unit of the character described in the last paragraph, wherein said mounting means is substantially self-adjusting to be backed and supported on a loading dock.

Another object of the invention is to provide a device of the character described wherein the resilient blocks are substantially self-adjusting during use to distribute the wear on the same.

These and other objects of the invention will be manifest from the following brief description and the accompanying drawings.

Of the accompanying drawings:

FIGURE 7 is a view corresponding to a portion of FIGURE 5, illustrating still another modified form of the invention.

FIGURE 8 is a horizontal cross-section taken substantially on the line 8—8 of FIGURE 7.

Figure 1:
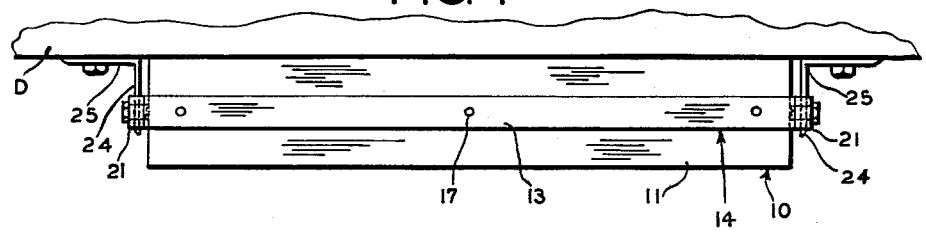
FIGURE 1 is a top plan view of a bumper unit embodying the features of the invention, mounted on a truck loading dock.
Figure 2:
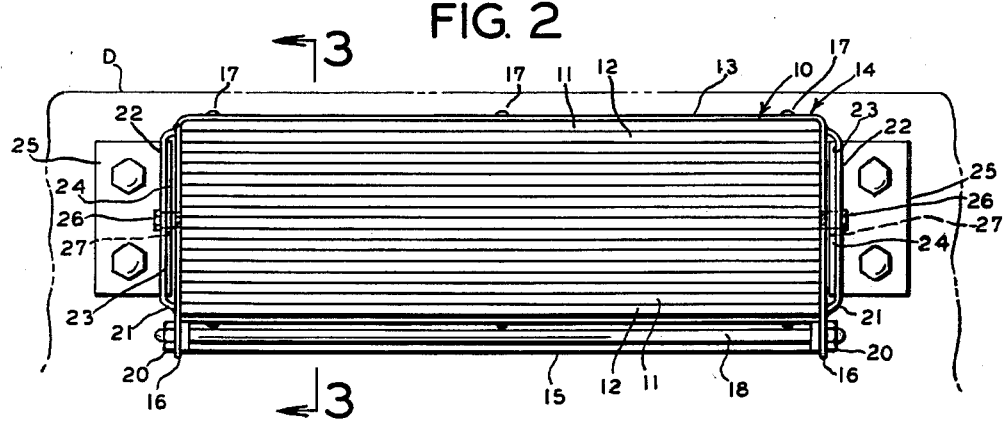
FIGURE 2 is a front elevation of the same, with the loading dock shown in chain-dotted lines.
Figure 3:
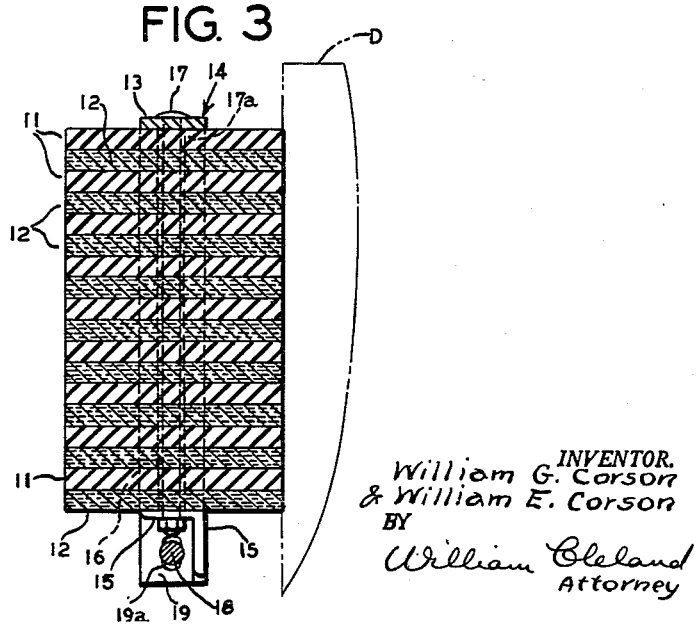
FIGURE 3 is an enlarged vertical cross-section taken on the line 3—3 of FIGURE 2.

Referring to the form of the invention shown in FIGURES 1 to 3, the numeral 10 designates a resilient block composed of a lamination of superposed, separate rectangular layers, 11, 11 and 12, 12, alternatively of two kinds of resilient shock absorbing material, the layers being of substantial thickness, as shown. The layers 12 may be of durable material such as rubberized fabric, fabric or wire reinforced rubber or the like, adapted to absorb heavy blows which yieldingly depress the material inwardly edgewise thereof. The layers 11 may be of relatively more flexible, elastic material, such as vulcanized rubber, or synthetic rubber-like material.

For supporting the block 10 with the layers 11 and 12 in superposed relation, as described above, it is clamped between a rigid, relatively narrow, cross-bar 13 of a U-shaped mounting bracket 14 and a rigid, relatively narrow clamping bar 15 vertically adjustably extending between the lower ends of laterally opposite downturned side members 16, 16 of the mounting bracket. The clamping bar 15 is shown as an angle iron clampingly urged toward the cross-bar 13, by means of a plurality of clamping bolts 17, 17 extending between one flange 15a of the angle iron and cross-bar 13, through the layers 11 and 12. The clamping bar also serves as a spacer for the lower ends of the side members 16 and is vertically adjustably mounted therebetween, by means of a rod 18 loosely received through slots 19a in plates 19, 19 welded on the ends of the angle irons, and similar slots in said lower ends of side members 16. Nuts 20, 20, threaded on the outer ends of rod 18, are adapted to be tightened against the side members 16 to apply resilient clamping pressure to the said members, against the ends of the block 10. Thus, the mounting bracket 14 and the clamping bar 15 constitute rigid supporting means encircling or encompassing the block 14, to have top and bottom sides of block 10 embraced by cross-bar 13 and clamping bar 15, respectively, and to have traversely opposite front and rear sides of the block at which the corresponding edges of the superposed layers 11, 11 and 12, 12 are exposed.

Each side member 16 may have an ear 21, affixed thereon defining a vertically elongated slot 23, for loose reception of an out-turned flange 24 of an angle bracket 25, the other flange of which is bolted, welded, or otherwise attached to a forward face of a truck loading dock D. A screw 26 is threaded through the straight portion 22 of each ear 21, and into the corresponding side member 16, but is loosely received through enlarged openings 27 in flange 24. That is, the bracket 14 is free to float vertically on the flanges 24, although it normally rests on the upper edges of the flanges.

For rigidly supporting the cross-bar 13 and the clamping bar 15 in parallelism, and to obviate downward bending of the cross-bar as by impact of a heavy object, the bolts 17 may be loosely received through metal sleeves or spacers 17a, extending between inwardly opposing faces of cross-bar 13 and flange 15a of the clamping bar. By means of the bolts 17, the cross-bar 13 and the clamping bar 15 are clamped inwardly against opposite ends of the sleeves or spacers 17a. The sleeves 17a may be loosely received through aligned openings (see FIGURE 5) in the layers 11 and 12, so that a requisite degree of slippage is possible between the adjacent layers in use of the device on a truck loading dock.

In use of the bumper unit described in connection with FIGURES 1 to 3, the usual heavy bumpers on trucks, loading or unloading at dock D, will strike the elastic block 10 against the solid backing of the forward face of said dock, inward impact, however, being generally absorbed by the resiliency of the elastic block. Such impact of the bumper against the block 10 is initially absorbed by the relatively less resilient reinforced rubber layers 12, which are yieldingly supported by rubber layers 11, which in turn allow the layers 12 to be yieldingly flexed and depressed to a more or less limited degree. Moreover, upon normal variation in the loads on said trucks the resultant vertical rubbing action applied by the vertically moving truck bumper will cause the fabric reinforced layers 12 to flex against the resiliency of the relatively more elastic supporting layers 11. Requisite flexing and yielding depression of the fabric-reinforced layers 12 is enhanced by the fact that the adjacent layers 11 and 12 are not adhered or attached to each other, particularly at the forward marginal portions of the layers where the most severe flexing and depressive forces are applied.

Provision of the improved mounting bracket 14, makes it possible for one worn out bumper unit to be easily replaced by a new bumper unit in several minutes, through adjustment of the screws 26. A worn out resilient block 10, in the bracket 14 also may be replaced by a new one.

Figure 4:
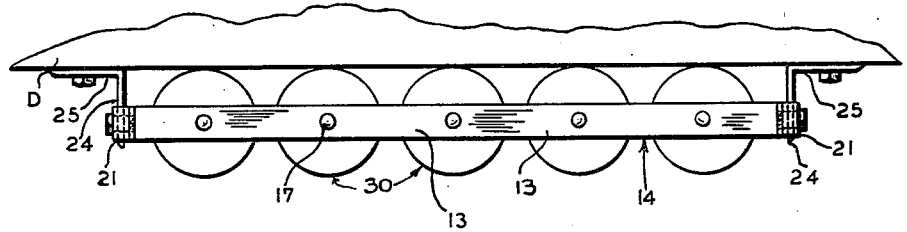
FIGURE 4 is a top plan view, corresponding to FIGURE 1, illustrating a modified form of the invention.
Figure 5:
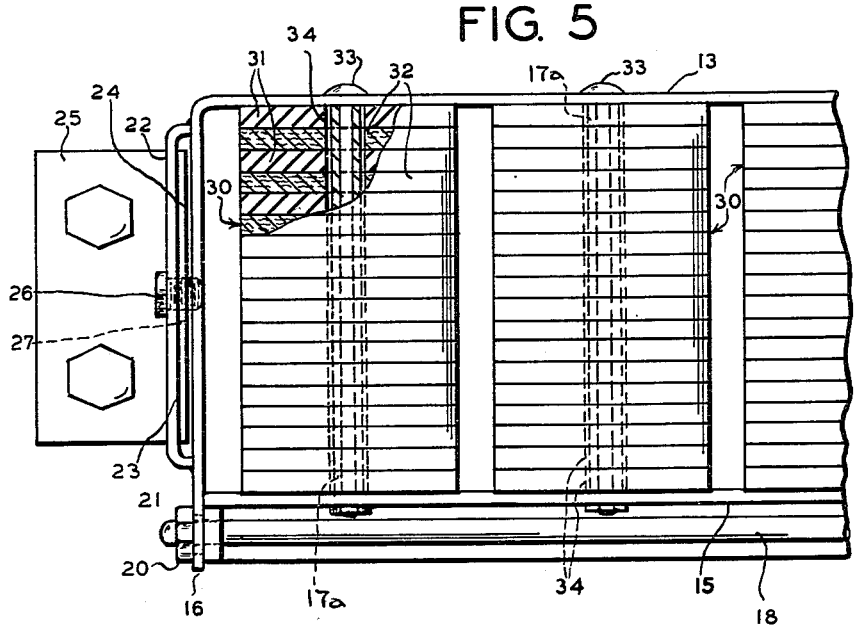
FIGURE 5 is an enlarged fragmentary front elevation, corresponding in part to FIGURE 2, of the device shown in FIGURE 4.

FIGURES 4 and 5 show a modified form of bumper unit, which is identical to the bumper unit shown in FIGURES 1 to 3, with the exception that block means comprising a plurality of laminated blocks 30, 30 are provided in place of the single block 10. Like parts, therefore are indicated by like numerals, unless otherwise noted.

Each block 30 comprises a lamination of separate centrally apertured discs, alternately of elastic material, such as vulcanized tire tread rubber, and fabric or like reinforced tread rubber, as before, said alternate layers being designated by the numerals 31 and 32, respectively. The discs 31 and 32 of the block 30 are held clamped in superposed relation, between the upper cross-bar 13 and the lower spacer bar 15, by a bolt 33 similar to the bolts 17, passing through aligned central apertures 34 of the discs. As before, the bolts 33 may be received through sleeves or spacers 17a for purposes set forth above.

In use of the modified bumper unit, such as on a boat dock C, in the manner previously described, the blocks 30 will tend to turn gradually with lateral frictional engagement thereof by a boat, whereby the bumper blocks will wear substantially uniformly peripherally thereof and the useful life of the same will be extended to a maximum degree.

Figure 6:
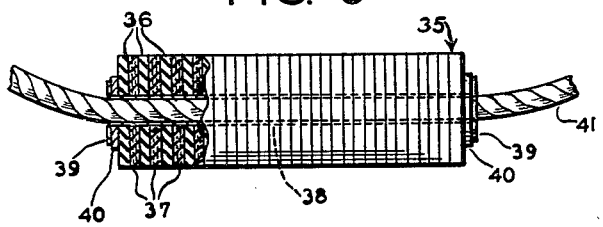
FIGURE 6 is a front view, partly broken away and in section, of another modified form of the invention.

Referring now to FIGURE 6, there is illustrated a modified form of bumper unit which is particularly useful for boats or boat docks. The unit may comprise a resilient block 35 having a plurality of separate centrally apertured discs, alternately of elastic material and reinforced elastic material, substantially as described in connection with FIGURES 4 and 5, and indicated by the numerals 36, 36 and 37, 37 respectively. The superposed layers, however, are held or clamped together by a tube or sleeve 38 received through the central openings thereof, the ends of the sleeve being peened, or flanged over at 39, against washers 40 positioned between the flanged portions and the outermost discs. The sleeve 38 is adapted to have a rope or cable 41 received therethrough for suspending the block 35 on a boat or boat dock, in known manner. It is contemplated that the discs may be more or less loosely suspended, as shown in FIGURE 6, so that they will tend to turn in use, with resultant maximum wearing qualities. For some uses the discs may be similarly suspended directly on the rope, that is, without the sleeve. The form of the invention shown in FIGURES 7 and 8 is substantially like the structure described in connection with FIGURES 4 and 5, except that laterally spaced blocks 30a, corresponding to the blocks 30, are each composed of superposed rectangular strips 31a and 32a alternately of rubber and fabric-reinforced rubber, respectively. Like parts therefore, are given like numerals, unless otherwise noted. These strips may be of uniform length, and uniformly arranged in progressively changing criss-crossed or spiralling relationship, so that the opposite outer ends of the strips lie generally in the surface of an imaginary cylinder. Strips 31a and 32a in clamped superposed relationship, are prevented from turning on each other as by provision of non-skid projections 43, 43 on the interengaging surfaces of the strips.

Use and operation of the structure of FIGURES 7 and 8 is substantially the same as described in connection with FIGURES 4 and 5. For example, the blocks 30a are adapted to be backed and supported by the loading dock D, as before, particularly upon application of inward bumping impact against the blocks.

Other modifications of the invention may be resorted to without departing from the spirit thereof, or the scope of the appended claims.

What is claimed is:

1. A bumper for a truck-loading dock structure or the like, comprising a shock-absorbing block means including at least one block having a plurality of separate superposed layers of stiff but flexible resilient material, said block means having transversely opposite front and rear sides at which the edges of the superposed layers are exposed and having opposite top and bottom sides between which said layers are vertically superposed, a rigid, continuous supporting unit encircling said block means and including vertically spaced block-supporting portions embracing said top and bottom sides, means for holding said layers in superposed relationship between said block-supporting portions to permit relative movement between adjacent vertically disposed layers and to have said exposed front and rear edges of the block means in substantial vertical alignment, and the front and rear portions of the block means being free and unobstructed with reference to corresponding transversely opposite front and rear sides of said supporting unit, and releasable means for mounting said encircling supporting unit on the dock structure to present said rear side of the block means unobstructedly against the dock structure, whereby the shock of engagement of a bumping body against the free and unobstructed front side of said block means is yieldingly absorbed substantially only by the block against the backing of the dock structure.

2. A bumper as set forth in claim 1, wherein said separate superposed pads are alternately of elastic material and relatively less resilient material.

3. A bumper as set forth in claim 2, at least said less resilient pads being of fabric reinforced elastic material.

4. A bumper for a truck-loading dock structure or the like, comprising a shock-absorbing block formed of a plurality of separate, superposed, rectangular pads of rubber-like resilient material, said block having transversely opposite front and rear sides at which the edges of the superposed pads are exposed and having opposite top and bottom sides between which said pads are vertically superposed, a rigid, continuous supporting unit encircling said block and including laterally opposite end portions and cross-members affixed in vertically spaced relation therebetween and embracing said top and bottom sides, said cross-members having means therebetween for holding said pads in said superposed relation but otherwise unattached to each other to permit relative slippage between adjacent said pads and to have opposite edge portions of the pads at said transversely opposite front and rear sides of the block in substantial alignment and the front and rear portions of said block being free and unobstructed with respect to the corresponding transversely opposite front and rear sides of the supporting unit, laterally spaced mounting means attachable to an existing said dock structure, and attaching means for connecting said supporting unit to the said mounting means to present the rear side of said block unobstructedly against the dock structure, whereby the shock of engagement of a bumping body against the free and unobstructed front side of said block is yieldingly absorbed substantially only by the block against the backing of the dock structure.

5. A bumper as set forth in claim 4, said attaching means providing a loose supporting connection between said end portions of the supporting unit and each said spaced mounting means, whereby the supporting unit is adapted to float on said spaced mounting means when said block is compressed by the bumping body.

6. A bumper as set forth in claim 4, said means for holding including laterally spaced spacer elements extending vertically through said pads and rigidly connected between said cross-members to limit inward movement thereof relatively of each other.

7. A bumper as set forth in claim 1, wherein said superposed layers are cylindrical pads of resilient material.

8. A bumper as set forth in claim 1, said means for holding including spaced spacer elements extending through said superposed pads and rigidly engaged between said cross-members to limit inward movement thereof relatively of each other.

9. A bumper as set forth in claim 1, said separate pads being of alternately varying shock-absorbing resiliency.

10. A bumper as set forth in claim 4, said separate pads being alternately of resilient elastic material and relatively less resilient material.

References Cited in the file of this patent

UNITED STATES PATENTS

| | | |
|---|---|---|
| Re. 18,672 | Lyons | Nov. 29, 1932 |
| Re. 24,276 | Schuyler | Feb. 12, 1957 |
| 1,815,413 | Lockwood | July 21, 1931 |
| 2,806,688 | Pollock | Sept. 17, 1957 |
| 2,893,720 | Bair | July 7, 1959 |